May 24, 1927.
J. M. GERHARD
1,629,661
CANDY DISPENSING BOX
Filed Nov. 23, 1926
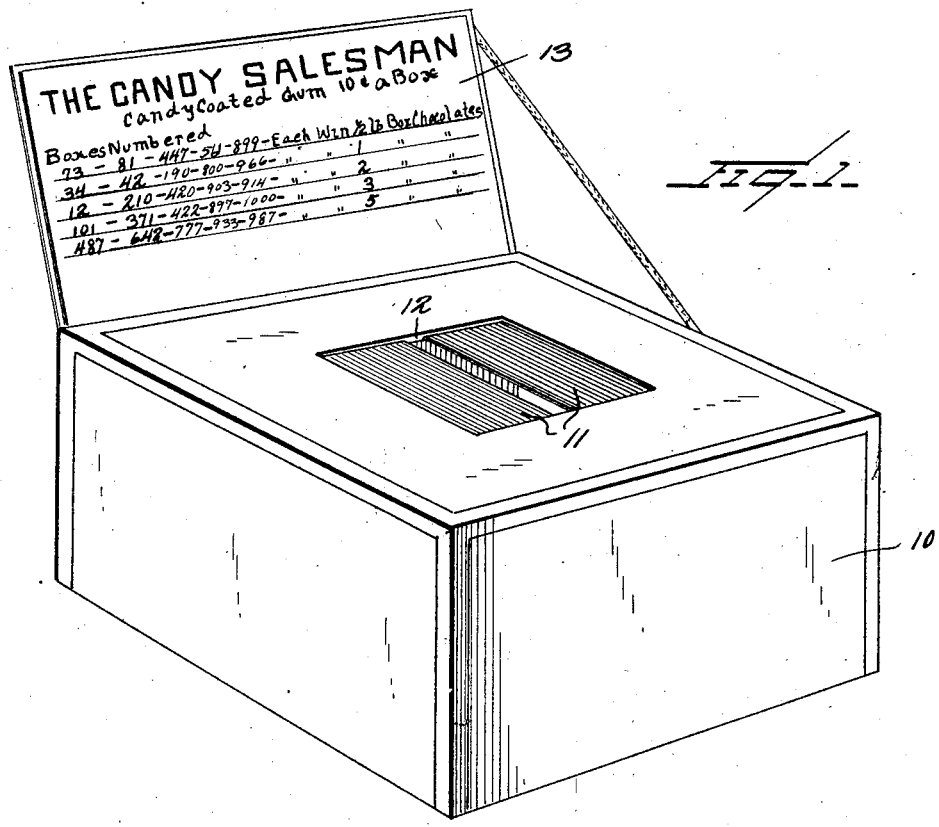
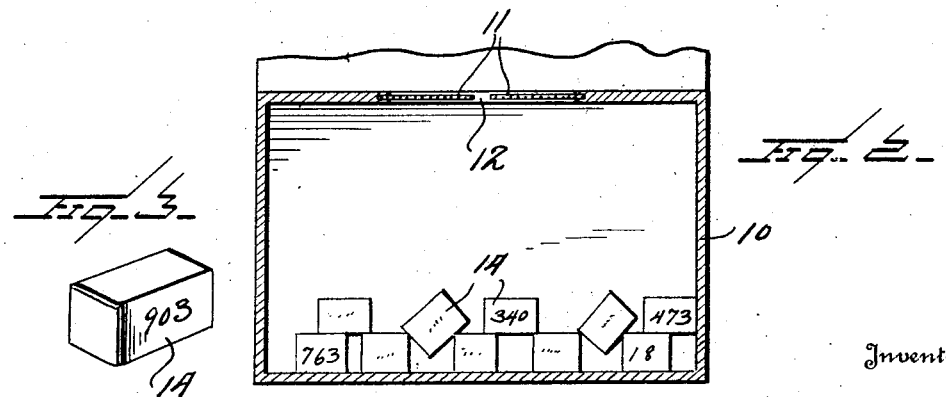

Patented May 24, 1927.

1,629,661

UNITED STATES PATENT OFFICE.

JOSEPH M. GERHARD, OF SHERIDAN, WYOMING.

CANDY-DISPENSING BOX.

Application filed November 23, 1926. Serial No. 150,316.

This invention relates to sales devices and particularly to a device for selling candies or like articles.

The general object of the present invention is to provide what may be termed a "rummage" box in which small packages of candy or the like will be placed and into which the buyer may insert his hand and take out, without seeing it, a package of candy, chewing gum, or other confection, this package having thereon a number. Certain of the numbers upon the small boxes of confection within the main box will be entitled to boxes of candy as prizes, the great majority of numbers, however, being "blanks" in the sense that there will be no prizes allotted to them.

A further object is to provide a candy dispenser of this character having an opening with an elastic closure so designed that it will permit the hand to be inserted within the box up to the wrist, but will not permit any numbers on the small packages of confection to be seen by the buyer.

My invention is illustrated in the accompanying drawings wherein:—

Figure 1 is a perspective view of a candy dispensing box constructed in accordance with my invention;

Fig. 2 is a transverse sectional view;

Fig. 3 is a perspective view of one of the small candy containing packages.

Referring to these drawings 10 designates the box which is illustrated as rectangular in form and which is provided in its top with a square opening defined by two transversely extending webs 11 of elastic webbing, rubber, or other elastic fabric. These two webs 11 are brought together sufficiently close as to provide a slit 12 within which the hand may be inserted, the rubber then closing around the hand so as to prevent observation but permitting the fingers to grasp any object within the box and withdraw it. Preferably there will be attached to the box, so as to extend upward therefrom, a placard 13 having an advertisement of the contents of the box and also having thereon a list of those numbers which are entitled to prizes. Thus, for instance, the person drawing box number 73, 81, 447, etc., will be entitled to one-half a box of chocolates. The purchaser who withdraws box number 34, 42, 800, etc., wins one box of chocolates. The person withdrawing box of candy number 487, 642, etc., will win five boxes of chocolates for each of these numbers. Obviously the numbers may be varied and the prizes also may be varied.

Within the main box there will be these small boxes of confection which are numbered 14 in the drawing, which confection may be in the form of candy coated chewing gum, small bits of candy or something of that kind.

The dispensing boxes as described will be made up in various sizes, various colors and forms, depending upon the candy to be vended and the economy of manufacture.

I do not wish to be limited to the use of elastic webbing as rubber or other equivalent material may be used. Neither do I wish to be limited to having the small boxes numbered as slips may be inserted in small boxes or packages. The dispensing boxes might be rectangular, circular, square or any desired shape. Obviously other goods than candy, chewing gum, or the like may be vended from this dispensing box.

I claim:—

A dispensing device consisting of a box having an opening for the insertion of the band, the opening being defined by elastic webs permitting the insertion of the hand but preventing observation of the contents of the box, the box containing relatively small packages, certain of the packages being numbered, and certain numbers drawing prizes.

In testimony whereof I hereunto affix my signature.

JOSEPH M. GERHARD.